United States Patent [19]
Ito

[11] 3,909,296
[45] Sept. 30, 1975

[54] SOLID ELECTROLYTE CELL
[75] Inventor: Yuzuru Ito, Sendai, Japan
[73] Assignee: Kabushiki Kaisha Daini Seikosha, Japan
[22] Filed: Nov. 19, 1974
[21] Appl. No.: 525,152

[30] Foreign Application Priority Data
Nov. 22, 1973 Japan.............................. 48-135034

[52] U.S. Cl............................. 136/83 R; 136/83 R
[51] Int. Cl.².......................................... H01M 13/00
[58] Field of Search..................... 136/83 R, 83 T, 6

[56] References Cited
UNITED STATES PATENTS
3,736,186 5/1973 Liang................................ 136/83 R
3,769,089 10/1973 Oomen.............................. 136/83 R Primary Examiner—John H. Mack
Assistant Examiner—C. F. LeFevour
Attorney, Agent, or Firm—Robert E. Burns; Emmanuel J. Lobato; Bruce L. Adams

[57] ABSTRACT

This invention relates to an improved β-alumina solid electrolyte cell. Cathodic active material for such cells often includes compounds having water of crystallization. It is proposed to dispose in the cathode a hygroscopic substance or material. Any free-water produced at cathode is absorbed by the hygroscopic substance, and the electro-chemical reaction of the cell is not hindered. The coefficient of utilization of the cathodic active material is increased and it is thus possible to manufacture solid electrolyte cells having a large capacity.

6 Claims, 3 Drawing Figures

U.S. Patent  Sept. 30,1975  3,909,296

SOLID ELECTROLYTE CELL

BACKGROUND OF THE INVENTION

This invention relates to a solid electrolyte cell having a solid electrolyte and more particularly to cells having solid electrolytes such as β-alumina and including compounds having water of crystallization as the cathodic-active materials.

A solid electrolyte cell has been proposed for use in the electronic industry for aviation, measurement and control apparatus, because it has long shelf life, low leakage of solvents, high generating voltage per unit cell, and it is easy to fabricate.

However, if a compound having water of crystallization is used as the cathodic-active material, free-water is produced during the discharge reaction. By the end of discharge, the amount of free-water is increased so that the internal pressure of the cell interferes with its proper operation causing discharge voltages to be unstable.

The cathode pellet may also be destroyed or broken up by the excess free-water thus increasing the internal resistance and diminishing the capacity of cathodic-active material.

SUMMARY OF THE INVENTION

It is a primary object of this invention to increase the capacity of the cell by eliminating above defect.

According to this invention, the free-water produced at the cathode is absorbed by a hygroscopic substance, positioned adjacent to the cathode structure. The chemical reaction of the cell is not prevented by this substance. Thus the coefficient of utilization for the cathodic active material is increased, and consequently the capacity of the cell is increased.

Other and further objects and advantages of the present invention will be apparent to one skilled in the art from the following description:

DETAILED DESCRIPTION OF THE INVENTION

Figure 1:
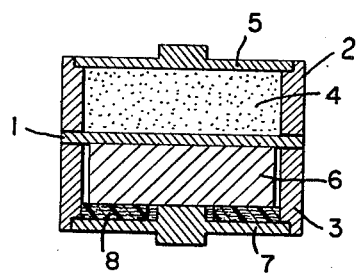
FIG. 1 shows a cross-sectional view of the cell according to one aspect of this invention.

Referring to FIG. 1, an anode can 2 and a cathode can 3, each made of stainless steel are respectively positioned at opposite sides of a β-alumina solid electrolyte 1 and fastened by an adhesive agent or metal paste. Conventional flanged cans with insulating gaskets such as used in button cells will also serve. The conductive portions of the cans 2 and 3 or conductive caps 5 and 7 thereof may serve as cell terminals.

The anode can 2 is filled with an anodic-active material 4 such as sodium and is sealed by anode cap 5 which is in contact with the sodium to provide a terminal. This filling of anode can 2 with sodium is preferably done in a "dry-box" which is first exhausted and then filled by argon gas of high purity.

The cathodic active material 6 is formed into a pellet by pressing in a mold. The cathodic active material is the mixture of powdered cupric sulfate, penta-hydrate ($CuSO_4.5H_2O$) and graphite in a weight ratio of 70:30. Binders may be included. The diameter of the cathodic pellet is 10mm, and the thickness is 2mm. Other ratios will serve as well as other cathodic materials containing water of crystallization such as cupric sulfate trihydrate. Other conductive powders may replace the graphite as is well known.

The hygroscopic substance 8, such as non-woven layers or wads or cloth made from synthetic fibers, such as polypropylene or rayon fibers, and similar absorbent materials, is interpositioned between the cathodic active material 6 and the cathode cap 7.

Figure 2:
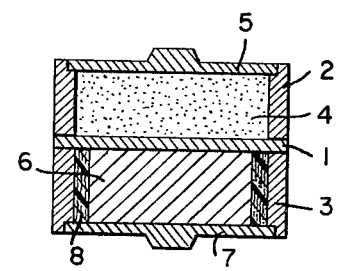
FIG. 2 is a cross-sectional view of a modification of the cell of FIG. 1.

FIG. 2 shows modification of the cell structure of FIG. 1. The only difference is the position of hygroscopic substance 8 between side surface of the cathodic active material 6 and side wall of the cathode can 3. The capacity of cathodic active material can be maintained by increasing the diameter of the cathode cup or the thickness of the cathode pellet.

Figure 3:
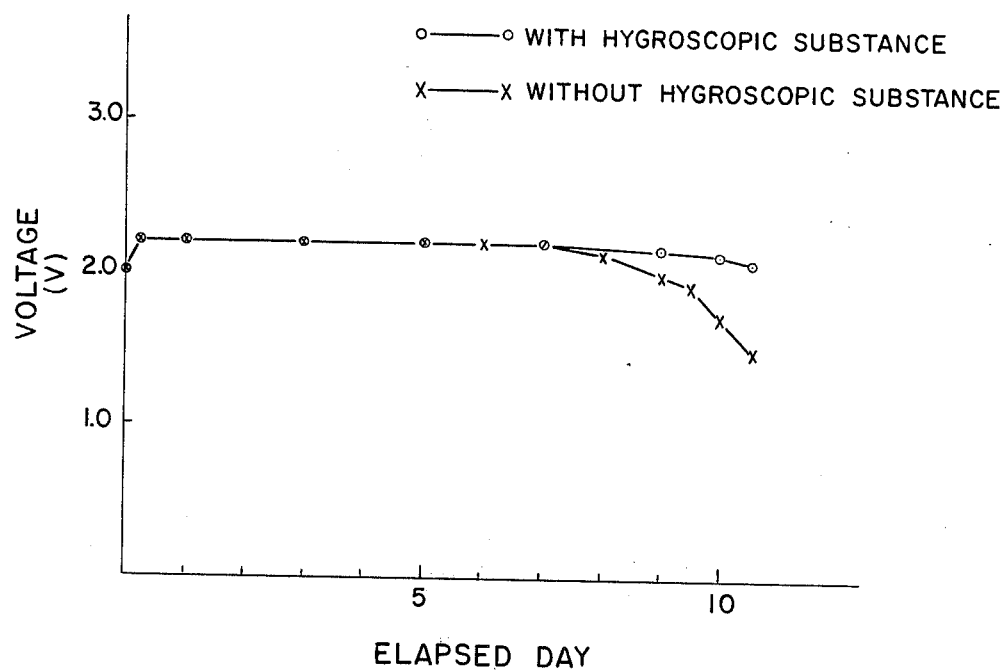
FIG. 3 shows the discharge characteristics of the cells through a 10 KΩ resistor.

FIG. 3 shows the discharge characteristics of the cell incorporating hygroscopic substance as according to this invention and the cell not incorporating hygroscopic substance. The discharge is through a 10 KΩ resistor load.

From FIG. 3 it can be seen that the coefficient of utilization of cathodic active material having hygroscopic substance included is increased about 15–20 per cent comparing with the cell having no hygroscopic substance.

While a preferred embodiment of the invention has been shown and described it will be understood that modifications and changes can be made within the true spirit and scope of the invention by the substitution of art recognized equivalent materials and structures.

What is claimed:

1. A solid electrolyte cell comprising an anodic-active material, a cathodic-active material and a solid electrolyte, said cathodic-active material including compounds having a water of crystallization within the molecule and having disposed adjacent to said cathodic active material a hygroscopic substance capable of absorbing the water of crystallization liberated during the discharge of said cell.

2. The solid electrolyte cell according to claim 1 wherein the cathodic active material includes a cupric sulfate salt having a water of crystallization.

3. The solid electrolyte cell according to claim 2, wherein the cathodic active material is the mixture of powdered cupric sulfate penta-hydrate and graphite in a weight ratio of 70:30.

4. The solid electrolyte cell according to claim 2, hygroscopic substance is a nonwoven wad or a cloth made from synthetic fibers.

5. The solid electrolyte cell according to claim 4 wherein said fibers are rayon or polypropylene fibers or blends thereof.

6. A solid electrolyte cell according to claim 2, wherein the anodic active material is sodium and the solid electrolyte is β-alumina.

* * * * *